US012294172B2

(12) United States Patent
Jeffries et al.

(10) Patent No.: US 12,294,172 B2
(45) Date of Patent: May 6, 2025

(54) ELECTRICAL CONNECTION SYSTEMS AND METHODS

(71) Applicant: Bullen Ultrasonics, Inc., Eaton, OH (US)

(72) Inventors: Bradley Jeffries, West Alexandria, OH (US); Eric Norton, New Paris, OH (US)

(73) Assignee: Bullen Ultrasonics, Inc., Eaton, OH (US)

( * ) Notice: Subject to any disclaimer, the term of this patent is extended or adjusted under 35 U.S.C. 154(b) by 339 days.

(21) Appl. No.: 18/049,741

(22) Filed: Oct. 26, 2022

(65) Prior Publication Data

US 2024/0145972 A1 May 2, 2024

(51) Int. Cl.

| | |
|---|---|
| ***H01R 13/42*** | (2006.01) |
| ***H01R 13/24*** | (2006.01) |
| ***H01R 13/52*** | (2006.01) |
| ***H01R 13/629*** | (2006.01) |
| ***H01R 13/66*** | (2006.01) |
| ***H01R 43/20*** | (2006.01) |

(52) U.S. Cl.

CPC ............. *H01R 13/42* (2013.01); *H01R 13/24* (2013.01); *H01R 13/5205* (2013.01); *H01R 13/629* (2013.01); *H01R 13/66* (2013.01); *H01R 43/20* (2013.01); *H01R 2201/00* (2013.01)

(58) Field of Classification Search

CPC .... H01R 13/6315; H01R 13/42; H01R 13/24; H01R 13/5205; H01R 13/629; H01R 13/66; H01R 43/20; H01R 2201/00

USPC ......................... 439/660, 247, 248, 578, 485

See application file for complete search history.

(56) References Cited

U.S. PATENT DOCUMENTS

| | | | | |
|---|---|---|---|---|
| 3,091,748 A * | 5/1963 | Takes | H01R 13/631 | 439/246 |
| 3,297,975 A | 1/1967 | Pope | | |
| 3,880,491 A * | 4/1975 | Ferro | H01R 13/6675 | 439/948 |
| 4,317,969 A | 3/1982 | Riegler | | |
| 4,782,244 A | 11/1988 | Wakimoto | | |

(Continued)

FOREIGN PATENT DOCUMENTS

| | | | |
|---|---|---|---|
| DE | 102020004993 A1 * | 2/2022 | H01R 12/721 |
| EP | 3007284 A1 * | 4/2016 | H01R 13/6315 |

(Continued)

*Primary Examiner* — Gary F Paumen

(74) *Attorney, Agent, or Firm* — Walters & Wasylyna LLC

(57) ABSTRACT

An electrical connection system includes a first electrical connector assembly and a second electrical connector assembly. The first electrical connector assembly includes a first housing and a first terminal assembly supported by the first housing. The second electrical connector assembly includes a second housing, a second terminal assembly supported by the second housing, at least a portion of the second terminal assembly being movable relative to the second housing between an extended position and a retracted position, and a biasing member that biases the second terminal assembly toward the extended position. The first terminal assembly and the second terminal assembly contact each other to establish an electrical connection upon arranging the first electrical connector assembly and the second electrical connector assembly near one another.

20 Claims, 9 Drawing Sheets

(56) References Cited

U.S. PATENT DOCUMENTS

| | | | | |
|---|---|---|---|---|
| 4,789,351 | A * | 12/1988 | Fisher, Jr. | H01R 13/6315 439/248 |
| 4,929,188 | A * | 5/1990 | Lionetto | H01R 13/17 439/607.22 |
| 5,002,500 | A * | 3/1991 | Zuccaro | H01R 13/53 439/378 |
| 5,329,262 | A * | 7/1994 | Fisher, Jr. | H01R 24/44 333/260 |
| 5,516,303 | A * | 5/1996 | Yohn | H01R 13/6315 439/248 |
| 5,558,541 | A * | 9/1996 | Botka | G01R 1/04 439/675 |
| 5,769,652 | A * | 6/1998 | Wider | H01R 24/50 439/63 |
| 6,309,231 | B1 | 10/2001 | Gordon et al. | |
| 7,077,697 | B2 * | 7/2006 | Kooiman | H01R 13/743 439/247 |
| 7,682,208 | B2 | 3/2010 | Bankstahl | |
| 7,779,716 | B2 | 8/2010 | Dellach et al. | |
| 7,922,529 | B1 * | 4/2011 | Meurer | H01R 13/2421 439/700 |
| 8,038,466 | B1 * | 10/2011 | Tai | H01R 12/7082 439/485 |
| 8,734,165 | B2 | 5/2014 | Neel | |
| 9,004,930 | B2 | 4/2015 | Gualino et al. | |
| 9,059,542 | B2 | 6/2015 | Oh et al. | |
| 9,190,782 | B2 | 11/2015 | King et al. | |
| 9,531,118 | B2 | 12/2016 | Byrne et al. | |
| 9,787,021 | B2 | 10/2017 | Lewin | |
| 11,167,411 | B2 | 11/2021 | Toothaker et al. | |
| 2016/0104969 | A1 * | 4/2016 | An | H01R 13/6315 439/248 |
| 2016/0164233 | A1 * | 6/2016 | Zhu | H01R 24/50 439/248 |
| 2018/0254574 | A1 | 9/2018 | Nicot | |
| 2019/0260150 | A1 * | 8/2019 | Costello | H01R 13/62938 |

FOREIGN PATENT DOCUMENTS

| | | | | |
|---|---|---|---|---|
| GB | 2404291 | A * | 1/2005 | E21B 17/028 |
| KR | 100894160 | | 4/2009 | |
| WO | WO-2020014173 | A1 * | 1/2020 | H01R 13/02 |

* cited by examiner

ELECTRICAL CONNECTION SYSTEMS AND METHODS

FIELD

The present disclosure relates generally to electrical connections and, more particularly, to electrical connection systems and methods for providing quick and reliable power connections between electrically powered devices.

BACKGROUND

Electrical connectors for industrial and various other applications must provide high quality electrical connection in a broad range of environmental conditions. In many applications, electrical connectors must accommodate repeated connection and disconnection cycles. Additionally, in some applications, it is advantageous for electrical connectors to accommodate automatic connection without human manipulation. In some industrial applications, electrical connectors must also accommodate extremely high voltages and/or amperages. Accordingly, those skilled in the art continue with research and development efforts in the field of electrical connections.

SUMMARY

Disclosed are examples of an electrical connection system, a manufacturing system, and an electrical connection method. The following is a non-exhaustive list of examples, which may or may not be claimed, of the subject matter according to the present disclosure.

In one or more examples, the disclosed electrical connection system includes a first electrical connector assembly. The first electrical connector assembly includes a first housing and a first terminal assembly that is supported by the first housing. The electrical connection system also includes a second electrical connector assembly. The second electrical connector assembly includes a second housing, a second terminal assembly that is supported by the second housing, wherein at least a portion of the second terminal assembly is movable relative to the second housing between an extended position and a retracted position, and a biasing member that biases the second terminal assembly toward the extended position. The first terminal assembly and the second terminal assembly are configured to contact each other to establish an electrical connection upon arranging the first electrical connector assembly and the second electrical connector assembly near one another.

In one or more examples, the disclosed manufacturing system includes a robotic manipulator and a machine tool. The manufacturing system also includes a first electrical connector assembly that is coupled to the machine tool. The first electrical connector assembly includes a first housing and a first terminal assembly that is supported by the first housing. The manufacturing system further includes a second electrical connector assembly that is coupled to the robotic manipulator. The second electrical connector assembly includes a second housing, a second terminal assembly that is supported by the second housing, wherein at least a portion of the second terminal assembly is movable relative to the second housing between an extended position and a retracted position, and a biasing member that biases on the second terminal assembly toward the extended position. The first terminal assembly and the second terminal assembly are configured to contact each other to establish an electrical connection upon coupling the machining tool to the robotic manipulator.

In another examples, the disclosed method includes steps of: (1) coupling a machine tool and a robotic manipulator together; (2) contacting a first terminal assembly of a first electrical connector assembly, coupled to the machine tool, and a second terminal assembly of a second electrical connector assembly, coupled to the robotic manipulator, upon coupling the machine tool and the robotic manipulator together; (3) establishing an electrical connection between the first terminal assembly and the second terminal assembly upon contacting the first terminal assembly and the second terminal assembly; and (4) biasing the first terminal assembly and the second terminal assembly in abutting contact.

Other examples of the disclosed electrical connection system, manufacturing system, and method will become apparent from the following detailed description, the accompanying drawings, and the appended claims.

DETAILED DESCRIPTION

Figure 1:
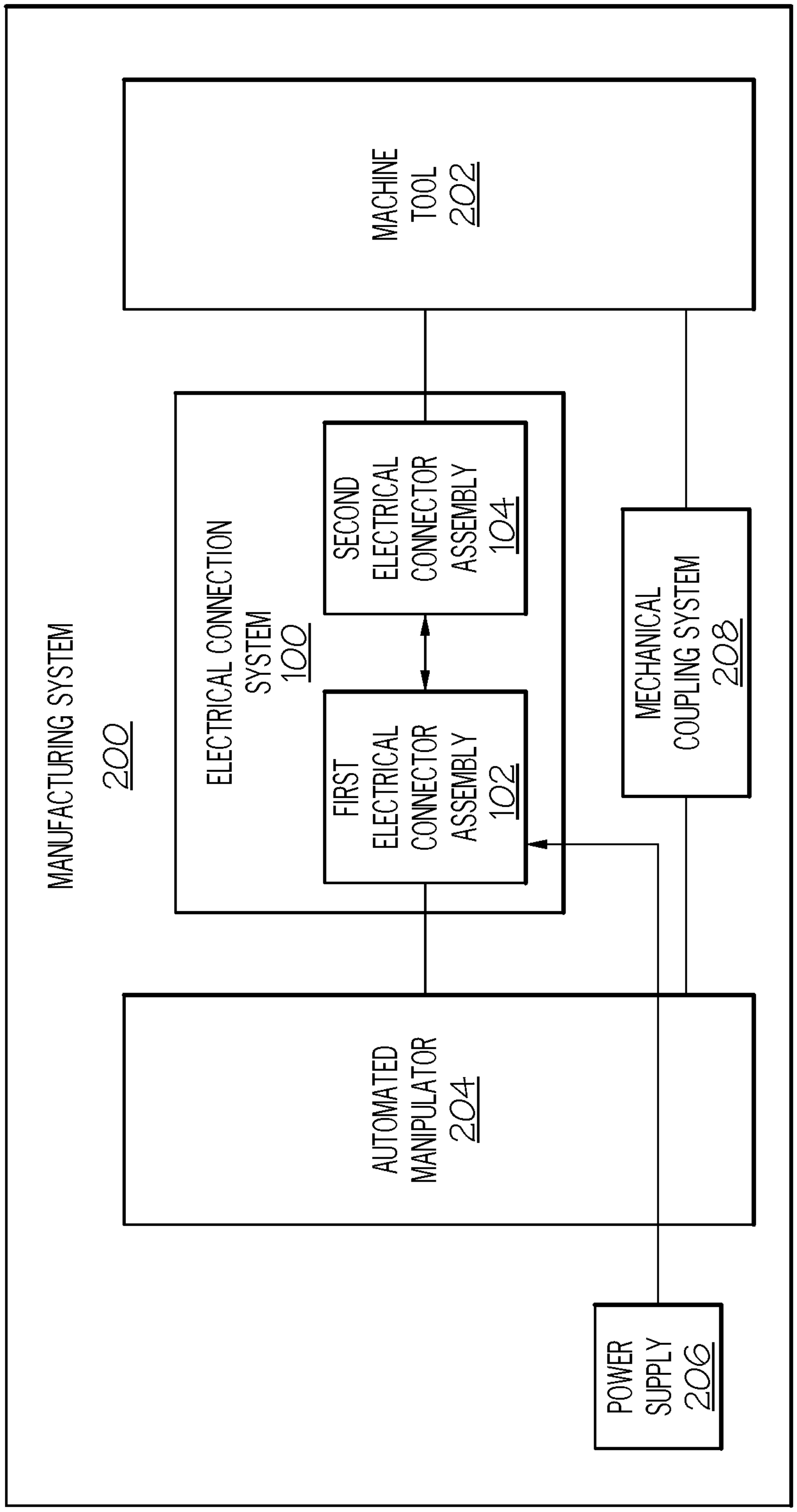
FIG. 1 is a schematic block diagram of an example of a manufacturing system.

Referring generally to FIGS. 1-9, by way of examples, the present disclosure is directed to an electrical connection system 100. By way of examples, the present disclosure is also directed to a manufacturing system 200 (FIG. 1). Examples of the manufacturing system 200 include or utilize the electrical connection system 100 to provide quick and reliable power connections between electrically powered devices in an industrial application.

Referring generally to FIG. 1 and to FIGS. 2-6, in one or more examples, the electrical connection system 100 includes a first electrical connector assembly 102 and a second electrical connector assembly 104. The first electrical connector assembly 102 and the second electrical connector assembly 104 provide a physical interface for transfer of electrical signals, such as for power, data, and/or audio-visual applications.

Referring to FIGS. 2-6, in one or more examples, the first electrical connector assembly 102 includes a first housing 106 and a first terminal assembly 108. The first terminal assembly 108 is supported by the first housing 106. In one or more examples, the first terminal assembly 108 is fixed (e.g., non-movable) relative to the first housing 106.

Figure 2:
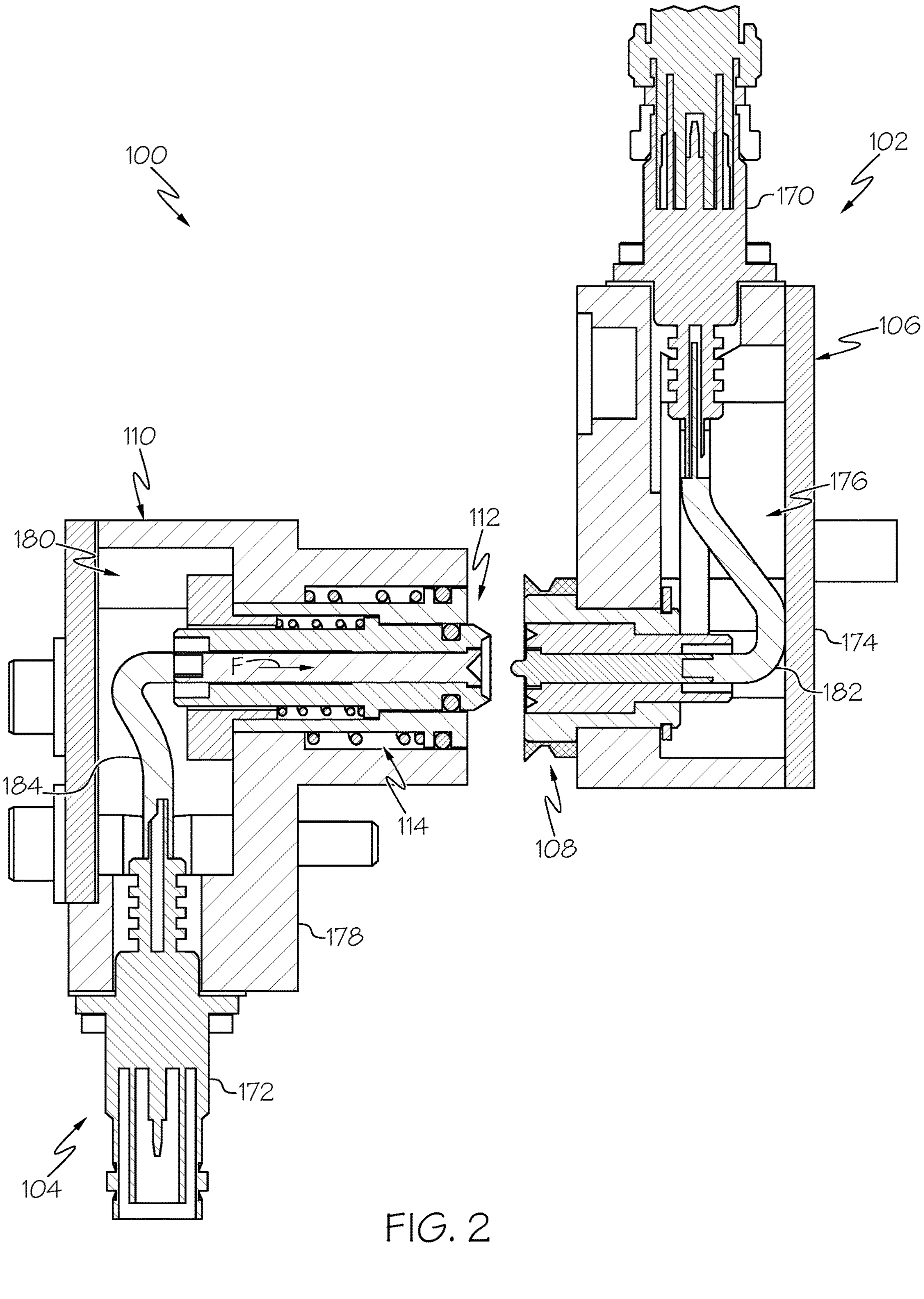
FIG. 2 is a schematic, sectional view of an example of an electrical connection system depicted in a disconnected configuration.
Figure 3:
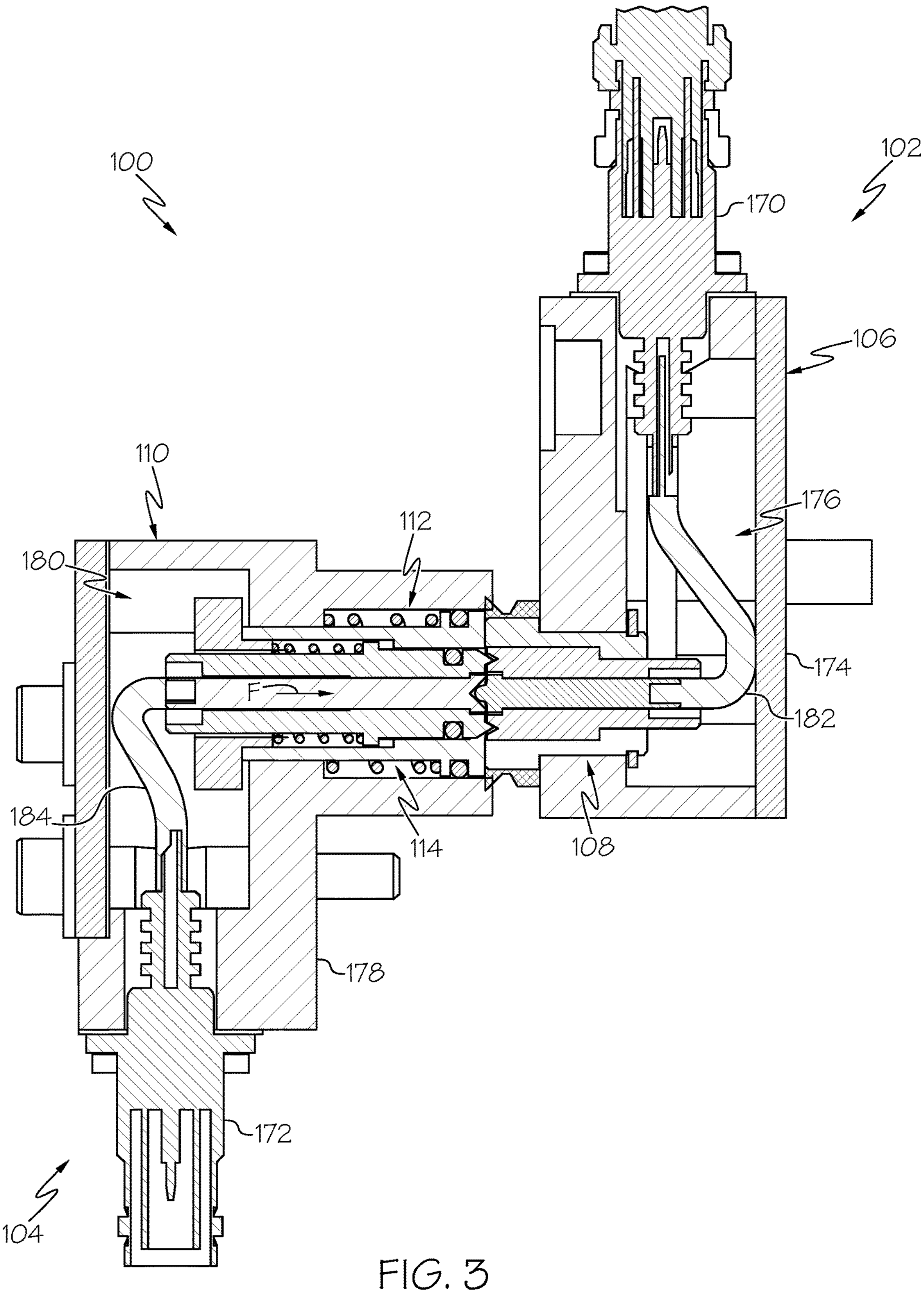
FIG. 3 is a schematic, sectional view of an example of the electrical connection system in a connected configuration.
Figure 4:
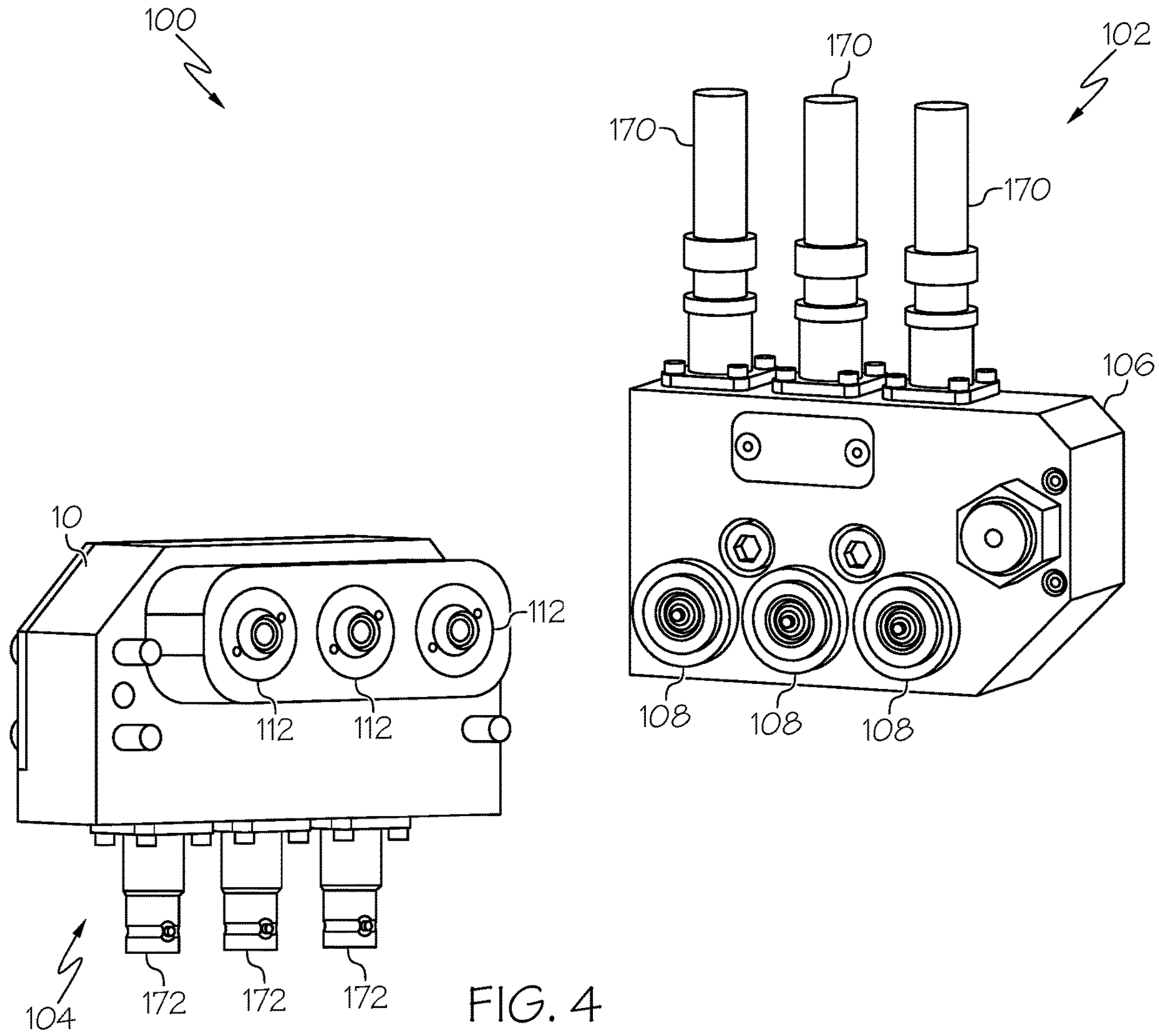
FIG. 4 is a schematic, perspective view of an example of a first electrical connector assembly and a second electrical connector assembly of the electrical connection system.
Figure 5:
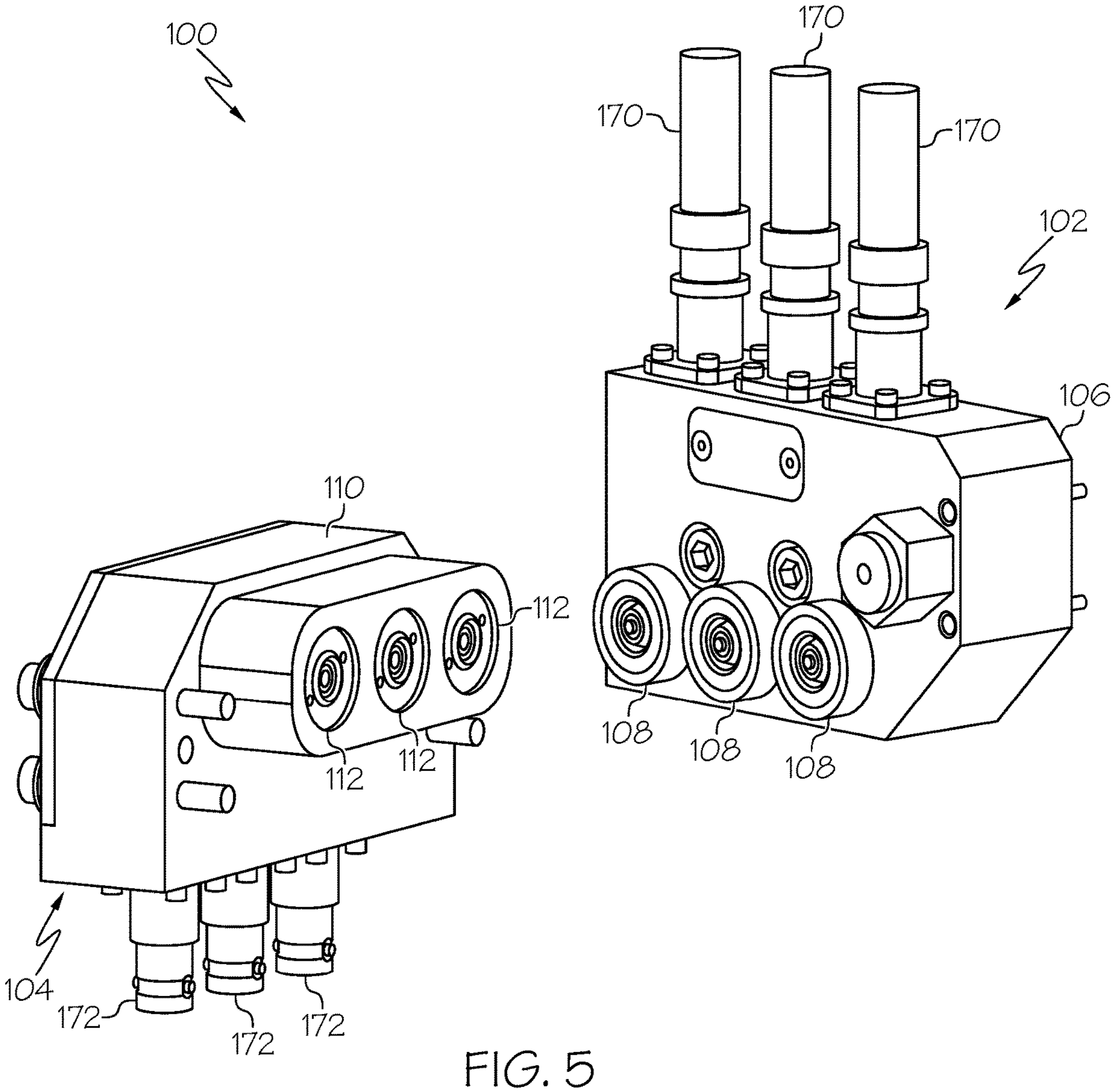
FIG. 5 is a schematic, perspective view of an example of the first electrical connector assembly and the second electrical connector assembly of the electrical connection system.

Referring now to FIGS. 2-5 and 7, in one or more examples, the second electrical connector assembly 104 includes a second housing 110 and a second terminal assembly 112. The second terminal assembly 112 is supported by the second housing 110. At least a portion of the second terminal assembly 112 is movable relative to the second housing 110 between an extended position (e.g., as shown in FIGS. 2 and 4) and a retracted position (e.g., as shown in FIGS. 3 and 5). The second connector assembly 104 also includes biasing member 114. The biasing member 114 biases the second terminal assembly 112 toward the extended position (FIGS. 2 and 4).

As illustrated in FIGS. 2 and 3, in one or more examples, the first terminal assembly 108 and the second terminal assembly 112 are configured to contact each other and establish an electrical connection upon arranging the first electrical connector assembly 102 and the second electrical connector assembly 104 near one another. As illustrated in FIG. 2, the first electrical connector assembly 102 and the second electrical connector assembly 104 are positioned proximate (e.g., at or near) each other such that the first terminal assembly 108 and the second terminal assembly 112 are generally aligned, for example, such that a first terminal axis 122 (FIG. 8) of the first terminal assembly 108 and a second terminal axis 130 (FIG. 9) of the second terminal assembly 112 are at least approximately aligned. The biasing member 114 applies a biasing force F (FIG. 2) to the second terminal assembly 112 that urges the second terminal assembly 112 in the extended position. Upon the first electrical connector assembly 102 and the second electrical connector assembly 104 being moved closer to each other, the first terminal assembly 108 and the second terminal assembly 112 come into abutting contact with each other to establish the electrical connection. As illustrated in FIG. 3, upon the first electrical connector assembly 102 and the second electrical connector assembly 104 being moved even closer to each other, the first terminal assembly 108 moves (e.g., pushes) the second terminal assembly 112 from the extended position (FIG. 2) toward the retracted position (FIG. 3). The biasing member 114 applies the biasing force F (FIG. 3) to the second terminal assembly 112 that urges and/or maintains the second terminal assembly 112 in abutting contact with the first terminal assembly 108 and, thereby, maintains the electrical connection.

Referring to FIGS. 2 and 3, in one or more examples, the first housing 106 is configured to house and/or support the first terminal assembly 108 and other electrical components of the first electrical connector assembly 102. In one or more examples, the first housing 106 includes a first body 174 that forms a first hollow interior 176. The first terminal assembly 108 is coupled to the first body 174. In one or more examples, the first terminal assembly 108 is fixed relative to the first body 174. A portion of the first terminal assembly 108 projects outward from the first body 174 or is disposed on an exterior of the first body 174. Another portion of the first terminal assembly 108 depends inwardly from the first body 174 or is disposed within the first hollow interior 176 of the first body 174.

In one or more examples, the first housing 106, such as the first body 174, is made of a non-electrically conductive material. In one or more examples, the first housing 106, such as the first body 174, is made of an electrical insulator. In one or more examples, the first housing 106, such as the first body 174, is made of polymeric or plastic material, such as polytetrafluoroethylene and the like.

In one or more examples, the second housing 110 is configured to house and/or support the second terminal assembly 112, the biasing member 114, and other electrical components of the second electrical connector assembly 104. In one or more examples, the second housing 110 includes a second body 178 that forms a second hollow interior 180. The second terminal assembly 112 is coupled to the second body 178. In one or more examples, at least a portion of the second terminal assembly 112 is movable relative to the second body 178, such as inward and outward from the second hollow interior 180. As an example, a portion of the second terminal assembly 112 projects outward from the second body 178 or is disposed on an exterior of the second body 178. Another portion of the second terminal assembly 112 depends inwardly from the second body 178 or is disposed within the second hollow interior 180 of the second body 178.

In one or more examples, the second housing 110, such as the second body 178, is made of a non-electrically conductive material. In one or more examples, the second housing 110, such as the second body 178, is made of an electrical insulator. In one or more examples, the second housing 110, such as the second body 178, is made of polymeric or plastic material, such as polytetrafluoroethylene and the like.

Referring now to FIGS. 4 and 5, in one or more examples, the first electrical connector assembly 102 includes and the first housing 106 supports a plurality of first terminal assemblies 108. For example, the first electrical connector assembly 102 can include any number of first terminal assemblies 108 having any suitable arrangement. Similarly, in one or more examples, the second electrical connector assembly 104 includes and the second housing 110 supports a plurality of second terminal assemblies 112. For example, the second electrical connector assembly 104 can include any number of second terminal assemblies 112 having any suitable arrangement. Generally, the first electrical connector assembly 102 and the second electrical connector assembly 104 have the same number of first terminal assemblies 108 and second terminal assemblies 112, respectively, in complementary arrangements such that each one of the first terminal assemblies 108 aligns with and contacts a corresponding one of the second terminal assemblies 112 when the first electrical connector assembly 102 and the second electrical connector assembly 104 are connected together.

Referring now to FIGS. 2-5, in one or more examples, in the extended position (FIGS. 2 and 4), a portion of the second terminal assembly 112 extends from the second housing 110. The first terminal assembly 108 is configured to move the second terminal assembly 112 toward the retracted position (FIGS. 3 and 5) upon contact of the first terminal assembly 108 and the second terminal assembly 112. The biasing member 114 (FIGS. 2 and 3) urges the first terminal assembly 108 and the second terminal assembly 112 in abutting contact (e.g., as shown in FIG. 3).

Figure 6:
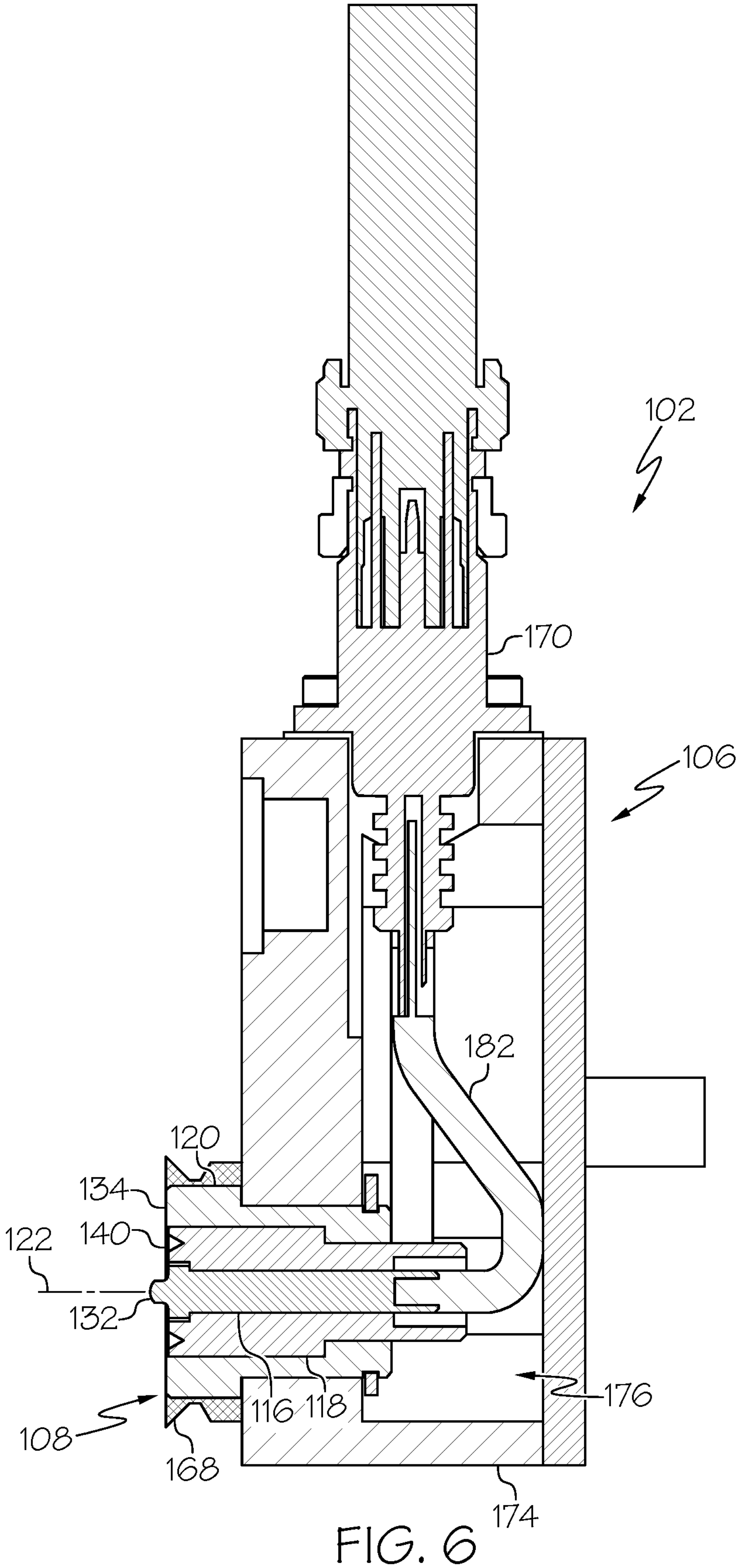
FIG. 6 is a schematic, sectional view of an example of the first electrical connector assembly.
Figure 8:
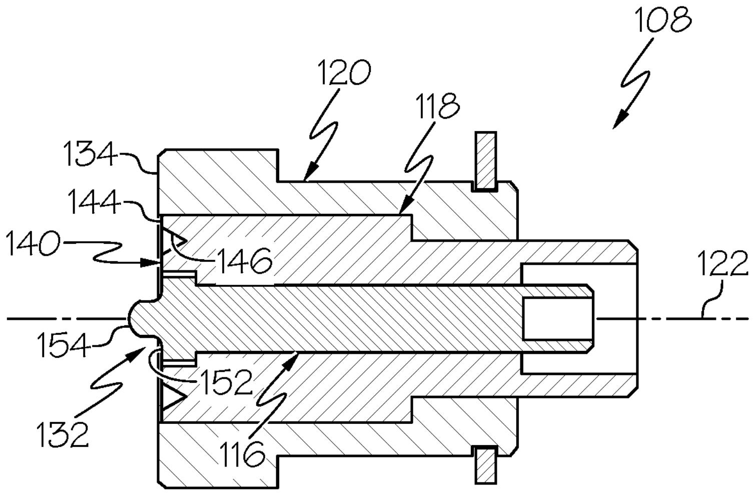
FIG. 8 is a schematic, sectional view of an example of a first terminal of the first electrical connector assembly.

Referring generally to FIGS. 2 and 3 and particularly to FIGS. 6 and 8, in one or more examples, the first terminal assembly 108 includes a first power terminal 116, a first insulator 118, and a first ground terminal 120. The first power terminal 116 provides for the transfer of an electrical signal, such as power. The first ground terminal 120 provides a common return of the electrical signal. The first insulator 118 isolates the first power terminal 116 and the first ground terminal 120.

In one or more examples, the first power terminal 116 and the first ground terminal 120 are made on an electrically conductive material. In one or more examples, the first insulator 118 is made of a non-electrically conductive material or an electrical insulator, such as a polymeric or plastic material, such as polytetrafluoroethylene and the like.

The first terminal assembly 108 can have various physical arrangements and/or configurations of the first power terminal 116, the first insulator 118, and the first ground terminal 120. In the illustrative examples, the first power terminal 116, the first insulator 118, and the first ground terminal 120 are arranged radially and/or circumscribe each other. In one or more examples, the first power terminal 116, the first insulator 118, and the first ground terminal 120 have circular cross-sectional shapes viewed along the first terminal axis 122. However, in other examples, the first power terminal 116, the first insulator 118, and the first ground terminal 120 can have other suitable cross-sectional geometries.

In one or more examples, the first power terminal 116 is located centrally and extends along a first terminal axis 122. The first insulator 118 is situated around the first power terminal 116. In one or more examples, the first insulator 118 extends along the first terminal axis 122 and circumferentially surrounds at least a portion the first power terminal 116. For example, the first insulator 118 circumscribes the first terminal axis 122 radially outward of the first power terminal 116. In one or more examples, the first insulator 118 is in contact with the first power terminal 116. The first ground terminal 120 is situated around the first insulator 118. In one or more examples, the first ground terminal 120 extends along the first terminal axis 122 and circumferentially surrounds at least a portion the first insulator 118. For example, the first ground terminal 120 circumscribes the first terminal axis 122 radially outward of the first insulator 118. In one or more examples, the first ground terminal 120 is in contact with the first insulator 118.

Figure 7:
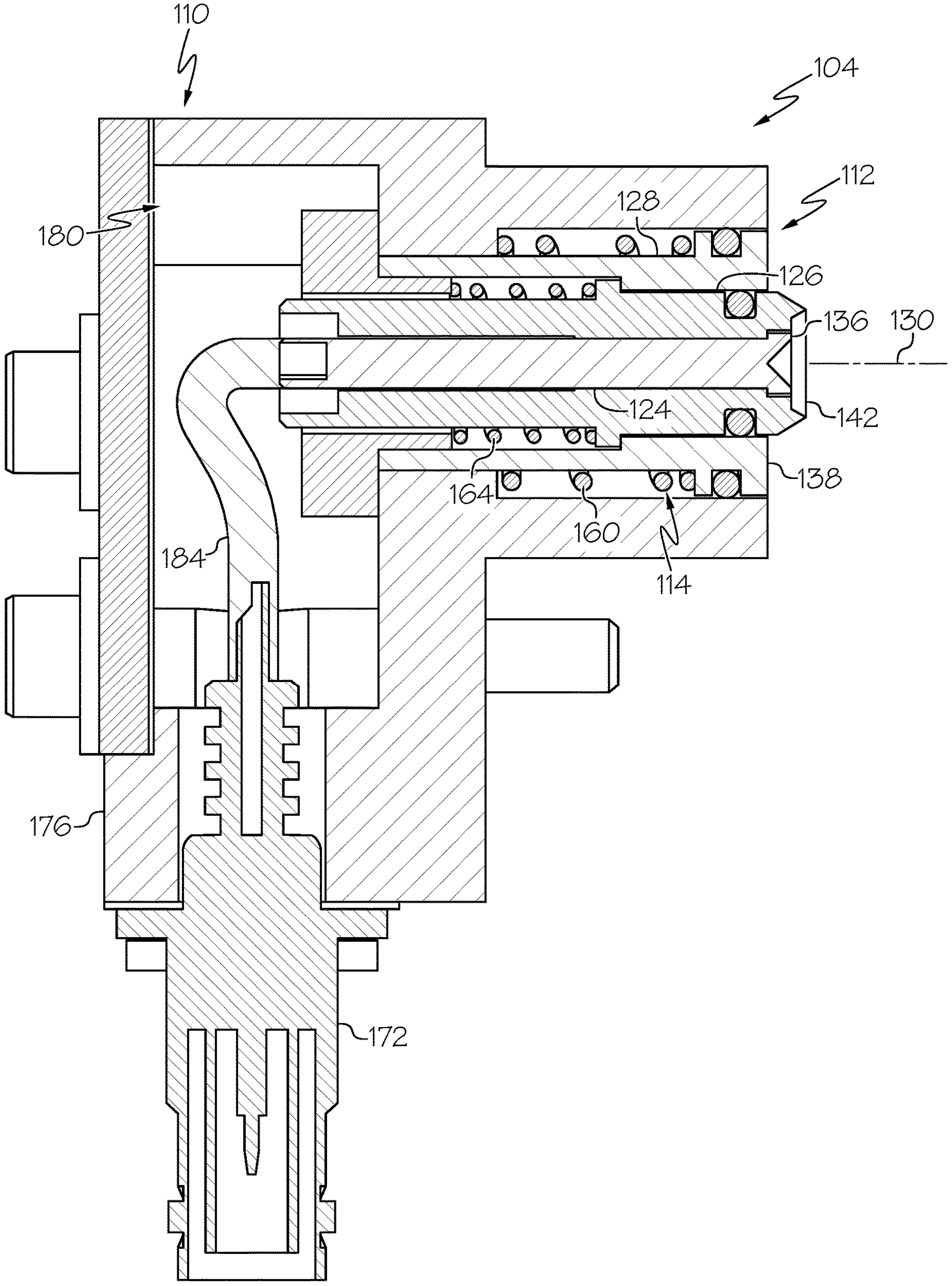
FIG. 7 is a schematic, sectional view of an example of the second electrical connector assembly.
Figure 9:
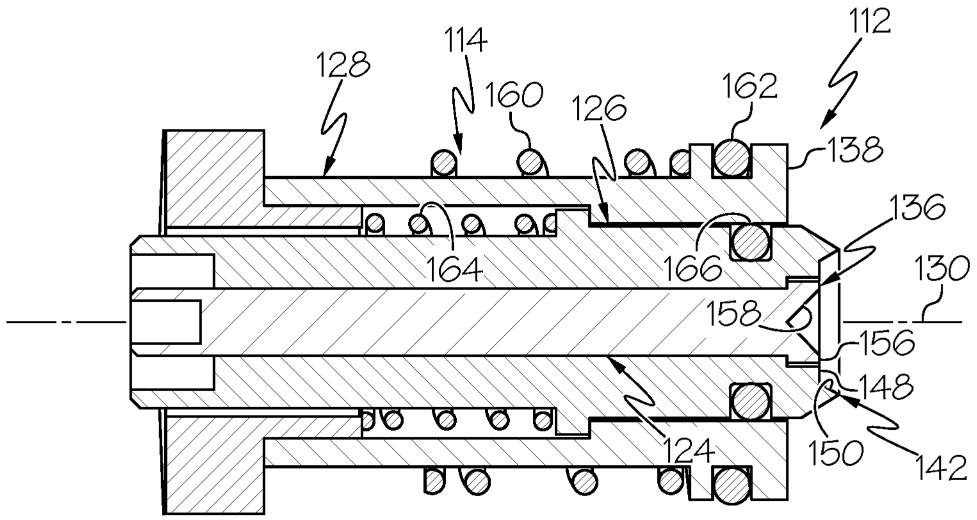
FIG. 9 is a schematic, sectional view of an example of a second terminal of the second electrical connector assembly.

Referring generally to FIGS. 2 and 3 and particularly to FIGS. 7 and 9, in one or more examples, the second terminal assembly 112 includes a second power terminal 124, a second insulator 126, and a second ground terminal 128. The second power terminal 124 provides for the transfer of an electrical signal, such as power. The second ground terminal 128 provides a common return of the electrical signal. The second insulator 126 isolates the second power terminal 124 and the second ground terminal 128.

In one or more examples, the second power terminal 124 and the second ground terminal 128 are made on an electrically conductive material. In one or more examples, the second insulator 126 is made of a non-electrically conductive material or an electrical insulator, such as a polymeric or plastic material, such as polytetrafluoroethylene and the like.

The second terminal assembly 112 can have various physical arrangements and/or configurations of the second power terminal 124, the second insulator 126, and the second ground terminal 128. In the illustrative examples, the second power terminal 124, the second insulator 126, and the second ground terminal 128 are arranged radially and/or circumscribe each other. In one or more examples, the second power terminal 124, the second insulator 126, and the second ground terminal 128 have circular cross-sectional shapes viewed along the second terminal axis 130. However, in other examples, the second power terminal 124, the second insulator 126, and the second ground terminal 128 can have other suitable cross-sectional geometries.

In one or more examples, the second power terminal 124 is located centrally and extends along a second terminal axis 130. The second insulator 126 is situated around the second power terminal 124. In one or more examples, the second insulator 126 extends along the second terminal axis 130 and circumferentially surrounds at least a portion the second power terminal 124. For example, the second insulator 126 circumscribes the second terminal axis 130 radially outward of the second power terminal 124. In one or more examples, the second insulator 126 is in contact with the second power terminal 124. The second ground terminal 128 is situated around the second insulator 126. In one or more examples, the second ground terminal 128 extends along the second terminal axis 130 and circumferentially surrounds at least a portion the second insulator 126. For example, the second ground terminal 128 circumscribes the second terminal axis 130 radially outward of the second insulator 126. In one or more examples, the second ground terminal 128 is in contact with the second insulator 126.

As illustrated in FIG. 3, upon contact of the first terminal assembly 108 and the second terminal assembly 112, the first power terminal 116 and the second power terminal 124 are in abutting contact and the first ground terminal 120 and the second ground terminal 128 are in abutting contact. Abutting contact between the first power terminal 116 and the second power terminal 124 and between the first ground terminal 120 and the second ground terminal 128 provide an electrical connection for the transfer of an electrical signal, such as electrical power.

In one or more examples, upon contact of the first terminal assembly 108 and the second terminal assembly 112, the first insulator 118 and the second insulator 126 are not in contact. In one or more examples, upon contact of the first terminal assembly 108 and the second terminal assembly 112, the first insulator 118 and the second insulator 126 are adjacent and proximate to (e.g., at or near without touching) each other.

Referring generally to FIGS. 2-6 and particularly to FIG. 8, in one or more examples, the first power terminal 116 includes a first power-terminal face 132. The first ground terminal 120 includes a first ground-terminal face 134. The first ground-terminal face 134 is situated along a periphery of the first power-terminal face 132. In one or more examples, the first power-terminal face 132 circumscribes the first terminal axis 122. In one or more examples, at least a portion of the first power-terminal face 132 is situated in a virtual plane that is perpendicular to the first terminal axis 122. In one or more examples, the first ground-terminal face 134 circumscribes the first terminal axis 122 radially outward of the first power-terminal face 132. In one or more examples, at least a portion of the first ground-terminal face 134 is situated in a virtual plane that is perpendicular to the first terminal axis 122. In one or more examples, at least a portion of the first power-terminal face 132 and at least a portion of the first ground-terminal face 134 share a common virtual plane that is perpendicular to the first terminal axis 122.

Referring now to FIGS. 2-5, 7 and 9, in one or more examples, the second power terminal 124 includes a second power-terminal face 136. The second ground terminal 128 includes a second ground-terminal face 138. The second ground-terminal face 138 is situated along a periphery of the second power-terminal face 136. In one or more examples, the second power-terminal face 136 circumscribes the second terminal axis 130 and at least a portion of the second power-terminal face 136 is situated in a virtual plane that is perpendicular to the second terminal axis 130. In one or more examples, the second ground-terminal face 138 circumscribes the second terminal axis 130 radially outward of the second power-terminal face 136 and at least a portion of the second ground-terminal face 138 is situated in a virtual plane that is perpendicular to the second terminal axis 130. In one or more examples, upon contact of the first terminal assembly 108 and the second terminal assembly 112 and the second terminal assembly 112 in the retracted position (FIG. 3), at least a portion of the second power-terminal face 136 and at least a portion of the second ground-terminal face 138 share a common virtual plane that is perpendicular to the second terminal axis 133.

As illustrated in FIG. 3, upon contact of the first terminal assembly 108 and the second terminal assembly 112, at least a portion of the first power-terminal face 132 and at least a portion of the second power-terminal face 136 are in abutting contact. Similarly, upon contact of the first terminal assembly 108 and the second terminal assembly 112, at least a portion of the first ground-terminal face 134 and at least a portion of the second ground-terminal face 138 are in abutting contact. Abutting contact between the first power-terminal face 132 and the second power-terminal face 136 and between the first ground-terminal face 134 and the second ground-terminal face 138 provide an electrical connection for the transfer of an electrical signal, such as electrical power.

In one or more examples, the first insulator 118 includes a first insulator face 140. The first insulator face 140 is situated along a periphery of the first power-terminal face 132. In one or more examples, the first insulator face 140 circumscribes the first terminal axis 122 radially outward of the first power-terminal face 132 and radially inward of the first ground-terminal face 134. In one or more examples, at least a portion of the first insulator face 140 is situated in a virtual plane that is perpendicular to the first terminal axis 122. In one or more examples, at least a portion of the first power-terminal face 132 and at least a portion of the first insulator face 140 share a common virtual plane that is perpendicular to the first terminal axis 122. In one or more examples, at least a portion of the first ground-terminal face 134 and at least a portion of the first insulator face 140 share a common virtual plane that is perpendicular to the first terminal axis 122. In one or more examples, at least a portion of the first power-terminal face 132, at least a portion of the first ground-terminal face 134, and at least a portion of the first insulator face 140 share a common virtual plane that is perpendicular to the first terminal axis 122.

In one or more examples, the second insulator 126 includes a second insulator face 142. The second insulator face 142 is situated along a periphery of the second power-terminal face 136. In one or more examples, the second insulator face 142 circumscribes the second terminal axis 130 radially outward of the second power-terminal face 136 and radially inward of the second ground-terminal face 138. In one or more examples, at least a portion of the second insulator face 142 is situated in a virtual plane that is perpendicular to the second terminal axis 130. In one or more examples, upon contact of the first terminal assembly 108 and the second terminal assembly 112 and the second terminal assembly 112 in the retracted position (FIG. 3), at least a portion of the second power-terminal face 136 and at least a portion of the second insulator face 142 share a common virtual plane that is perpendicular to the second terminal axis 130. In one or more examples, upon contact of the first terminal assembly 108 and the second terminal assembly 112 and the second terminal assembly 112 in the retracted position (FIG. 3), at least a portion of the second ground-terminal face 138 and at least a portion of the second insulator face 142 share a common virtual plane that is perpendicular to the second terminal axis 130. In one or more examples, upon contact of the first terminal assembly 108 and the second terminal assembly 112 and the second terminal assembly 112 in the retracted position (FIG. 3), at least a portion of the second power-terminal face 136, at least a portion of the second ground-terminal face 138, and at least a portion of the second insulator face 142 share a common virtual plane that is perpendicular to the second terminal axis 130.

In one or more examples, upon contact of the first terminal assembly 108 and the second terminal assembly 112, the first insulator face 140 and the second insulator face 142 are not in contact. In one or more examples, upon contact of the first terminal assembly 108 and the second terminal assembly 112, the first insulator face 140 and the second insulator face 142 are adjacent and proximate to (e.g., at or near without touching) each other.

In one or more examples, the first power-terminal face 132 and the second power-terminal face 136 are circular in shape, viewed along a respective one of the first terminal axis 122 and the second terminal axis 130. In one or more examples, the first ground-terminal face 134 and the second ground-terminal face 138 are annular in shape, viewed along a respective one of the first terminal axis 122 and the second terminal axis 130. In one or more examples, the first insulator face 140 and the second insulator face 142 are annular in shape, viewed along a respective one of the first terminal axis 122 and the second terminal axis 130.

In one or more examples, the first power-terminal face 132 and the second power-terminal face 136 are planar (e.g., flat). In one or more examples, the first ground-terminal face 134 and the second ground-terminal face 138 are planar. In one or more examples, the first insulator face 140 and the second insulator face 142 are planar. In other examples, one or more of the first power-terminal face 132, the second power-terminal face 136, the first ground-terminal face 134, the second ground-terminal face 138, the first insulator face 140, and the second insulator face 142 have a planar portion and a non-planar (e.g., contoured, curved, or otherwise non-flat shaped) portion.

Referring to FIGS. 8 and 9, in one or more examples, the first insulator face 140 includes a first insulator-face planar portion 144 and a first insulator-face nonplanar portion 146. The second insulator face 142 includes a second insulator-face planar portion 148 and a second insulator-face nonplanar portion 150. In one or more examples, upon contact of the first terminal assembly 108 and the second terminal assembly 112, the first insulator-face planar portion 144 and the second insulator-face planar portion 148 are proximate and not in contact with one another. In one or more examples, upon contact of the first terminal assembly 108 and the second terminal assembly 112, the first insulator-face nonplanar portion 146 and the second insulator-face nonplanar portion 150 are proximate, not in contact with, and mate with one another. In one or more examples, at least a portion of the first insulator-face nonplanar portion 146 and at least a portion of the second insulator-face nonplanar portion 150 initially mate with one another upon proximate and partial contact arrangement of the first terminal assembly 108 and the second terminal assembly 112. Generally, the mating, non-contact arrangement of the first insulator-face nonplanar portion 146 and the second insulator-face nonplanar portion 150 provides an insulation shield that closes a radial gap between the abutting first and second power terminals 116, 124 and abutting first and second ground terminals 120, 128 to prevent electrical arcing between the first and second power terminals 116, 124 and the first and second ground terminals 120, 128 during initial contact of the first terminal assembly 108 and the second terminal assembly 112.

In one or more examples, as illustrated in FIGS. 8 and 9, the first insulator-face nonplanar portion 146 includes or takes the form of a recess or groove, such as an annular recess or groove, that depends inwardly from the first insulator-face planar portion 144. The second insulator-face nonplanar portion 150 includes or takes the form of a protrusion or ridge, such as an annular protrusion or ridge, that projects outward from the second insulator-face planar portion 148. However, in other examples, this arrangement can be reversed.

Referring still to FIGS. 8 and 9, in one or more examples, the first power-terminal face 132 includes a first power-terminal-face planar portion 152 and a first power-terminal-face nonplanar portion 154. The second power-terminal face 136 includes a second power-terminal-face planar portion 156 and a second power-terminal-face nonplanar portion 158. In one or more examples, upon contact of the first terminal assembly 108 and the second terminal assembly 112, at least a portion of the first power-terminal-face nonplanar portion 154 and the second power-terminal-face nonplanar portion 158 mate with and contact one another. In one or more examples, upon contact of the first terminal assembly 108 and the second terminal assembly 112, at least a portion of the first power-terminal-face planar portion 152 and the second power-terminal-face planar portion 156 contact one another. Generally, the mating, contact arrangement of the first power-terminal-face nonplanar portion 154 and the second power-terminal-face nonplanar portion 158 ensures at least some degree of surface contact between the first power-terminal face 132 and the second power-terminal face 136. Additionally, the first power-terminal-face nonplanar portion 154 and the second power-terminal-face nonplanar portion 158 increase the contact surface area between the first power-terminal face 132 and the second power-terminal face 136. Further, the first power-terminal-face nonplanar portion 154 and the second power-terminal-face nonplanar portion 158 center and/or urge the first terminal assembly 108 and the second terminal assembly 112 into at least approximately co-axial alignment (e.g., approximate alignment of the first terminal axis 122 and the second terminal axis 130) upon contact.

In one or more examples, as illustrated in FIGS. 8 and 9, the first power-terminal-face nonplanar portion 154 includes or takes the form of a protrusion, such as a spherical or semi-spherical protrusion that projects outwardly from the first power-terminal-face planar portion 152. The second power-terminal-face nonplanar portion 158 includes or takes the form of a recess that depends inwardly from the second power-terminal-face planar portion 156. However, in other examples, this arrangement can be reversed.

Referring generally to FIGS. 2 and 3 and particularly to FIGS. 7 and 9, in one or more examples, the second power terminal 124, the second insulator 126, and the second ground terminal 128 are movable along the second terminal axis 130 relative to the second housing 110 (the second housing 110 is not shown in FIG. 9). Movement of the second power terminal 124, the second insulator 126, and the second ground terminal 128 enables establishing the electrical connection while accommodating for imperfect positioning or alignment of the first terminal assembly 108 and the second terminal assembly 112.

In one or more examples, the second power terminal 124 is coupled and fixed relative to the second insulator 126. The second insulator 126 is coupled and fixed relative to the second ground terminal 128. The second ground terminal 128 is coupled and movable relative to the second housing 110. As such, in these examples, the second power terminal 124, the second insulator 126, and the second ground terminal 128 move as a unit relative to the second housing 110.

In one or more examples, the biasing member 114 includes a first spring 160. The first spring 160 is engaged with the second housing 110 (not shown in FIG. 9) and the second ground terminal 128. In one or more examples, the first spring 160 is a coil spring disposed or situated around the second ground terminal 128 and between the second ground terminal 128 and the second housing 110. In these examples, the second ground terminal 128 and the second housing 110 each includes a motion limiter or stop that provides a stop to the extended position and the retracted position or that otherwise limits linear movement (e.g., extension and retraction) of the second terminal assembly 112.

In one or more of these examples, the second electrical connector assembly 104 also includes a first gasket 162. The first gasket 162 is situated between the second housing 110 and the second ground terminal 128. The first gasket 162 provides an internal seal interface between mating surfaces of the second housing 110 and the second ground terminal 128 and prevents debris or other environmental contaminates from entering the second hollow interior 180 of the second housing 110. In one or more examples, the first gasket 162 is a rubber O-ring.

In one or more examples, the first gasket 162 also provides some conformity to the second terminal assembly 112 for accommodating imperfect alignment of the first terminal assembly 108 and the second terminal assembly 112. For example, the first gasket 162 can enable the second terminal assembly 112 (e.g., the combination of the second power terminal 124, the second insulator 126, and the second ground terminal 128) to "float" relative to the second housing 110 or otherwise partially rotate or pivot about an axis that is perpendicular to the second terminal axis 130.

In one or more examples, the second power terminal 124 and the second insulator 126 are movable relative the second ground terminal 128. Movement of the second power terminal 124 and the second insulator 126 relative to the second ground terminal 128 enables establishing the electrical connection while accommodating for imperfect positioning or alignment of the first terminal assembly 108 and the second terminal assembly 112. Movement of the second power terminal 124 and the second insulator 126 relative to the second ground terminal 128 also enables the second power terminal 124 and the second insulator 126 to be at a different position along the second terminal axis 130 relative to the second ground terminal 128 during contact between the first terminal assembly 108 and the second terminal assembly 112 and/or during extension and/or retraction of the second terminal assembly 112.

In one or more examples, the second power terminal 124 is coupled and fixed relative to the second insulator 126. The second insulator 126 is coupled and movable relative to the second ground terminal 128. The second ground terminal 128 is coupled and fixed relative to the second housing 110. As such, in these examples, the second power terminal 124 and the second insulator 126 move as a unit relative to the second ground terminal 128 and the second housing 110.

In one or more examples, the biasing member 114 includes a second spring 164. The second spring 164 is engaged with the second ground terminal 128 and the second insulator 126. In one or more examples, the second spring 164 is a coil spring disposed or situated around the second insulator 126 and between the second insulator 126 and the second ground terminal 128. In these examples, the second insulator 126 and the second ground terminal 128 each includes a motion limiter or stop that provides a stop to the extended position and the retracted position or that otherwise limits linear movement (e.g., extension and retraction) of the second terminal assembly 112.

In one or more of these examples, the second electrical connector assembly 104 also includes a second gasket 166. The second gasket 166 is situated between the second ground terminal 128 and the second insulator 126. The second gasket 166 provides an internal seal interface between mating surfaces of the second insulator 126 and the second ground terminal 128 and prevents debris or other environmental contaminates from entering the second terminal assembly 112. In one or more examples, the second gasket 166 is a rubber O-ring.

In one or more examples, the second gasket 166 also provides some conformity to the second terminal assembly 112 for accommodating imperfect alignment of the first terminal assembly 108 and the second terminal assembly 112. For example, the second gasket 166 can enable the combination of the second power terminal 124 and the second insulator 126 to "float" relative to the second ground terminal 128 or otherwise partially rotate or pivot about an axis that is perpendicular to the second terminal axis 130.

In one or more examples, the second power terminal 124, the second insulator 126, and the second ground terminal 128 are movable relative to the second housing 110. The second power terminal 124 and the second insulator 126 are also separately movable relative the second ground terminal 128. In these examples, the biasing member 114 includes the first spring 160 engaged with the second housing 110 and the second ground terminal 128 and the second spring 164 engaged with the second ground terminal 128 and the second insulator 126. In one or more of these examples, the second electrical connector assembly 104 also includes the first gasket 162 situated between the second housing 110 and the second ground terminal 128 and the second gasket 166 situated between the second ground terminal 128 and the second insulator 126.

In one or more examples, the second power terminal 124 is coupled and fixed relative to the second insulator 126. The second insulator 126 is coupled and movable relative to the second ground terminal 128. The second ground terminal 128 is coupled and movable relative to the second housing 110. As such, in these examples, the second power terminal 124, the second insulator 126, and the second ground terminal 128 can move as a unit relative to the second housing 110, the second power terminal 124 and the second insulator 126 can also move as a unit relative to the second ground terminal 128, and the second ground terminal 128 can move relative to the second housing 110 and the second power terminal 124 and the second insulator 126.

Referring now to FIGS. 2-6, in one or more examples, the first electrical connector assembly 102 includes a seal 168. The seal 168 is situated around the first ground terminal 120 of the first terminal assembly 108. In one or more examples, the seal 168 is situated along a periphery of the first ground-terminal face 134. In one or more examples, the seal 168 circumscribes the first terminal axis 122 (FIG. 8) radially outward of the first ground-terminal face 134. In one or more examples, upon contact of the first terminal assembly 108 and the second terminal assembly 112 (FIG. 3), the seal 168 is configured to engage the second housing 110. The seal 168 provides an external seal interface around the abutting contact surfaces of the first terminal assembly 108 and the second terminal assembly 112 and prevents debris or other environmental contaminates from entering therebetween.

Referring now to FIGS. 1-7, in one or more examples, the first electrical connector assembly 102 includes a third terminal assembly 170. The third terminal assembly 170 is supported by the first housing 106. The third terminal assembly 170 is electrically connected to the first terminal assembly 108. In one or more examples, the third terminal assembly 170 is electrically connected to the first terminal assembly 108 via a first electrical line 182 located in the first hollow interior 176 of the first housing 106.

The third terminal assembly 170 includes any electrical connection terminal suitable for electrical connection to another device. For example, the third terminal assembly 170 is configured to be electrically connected to a machine tool 202 (FIG. 1). As an example, the third terminal assembly 170 includes a pair (e.g., male and female) electrical connector that are mated and mechanically coupled to establish an electrical connection between the machine tool 202 and the first terminal assembly 108.

In one or more examples, the second electrical connector assembly 104 includes a fourth terminal assembly 172. The fourth terminal assembly 172 is supported by the second housing 110. The fourth terminal assembly 172 is electrically connected to the second terminal assembly 112. In one or more examples, the fourth terminal assembly 172 is electrically connected to the second terminal assembly 112 via a second electrical line 184 located in the second hollow interior 180 of the second housing 110.

The fourth terminal assembly 172 includes any electrical connection terminal suitable for electrical connection to another device. For example, the fourth terminal assembly 172 is configured to be electrically connected to a power supply 206 (FIG. 1) or to an automated manipulator 204 (FIG. 1). As an example, the fourth terminal assembly 172 includes a pair (e.g., male and female) electrical connector that are mated and mechanically coupled to establish an electrical connection between the power supply 206 and the second terminal assembly 112.

Referring to FIG. 1, in one or more examples, the electrical connection system 100 is utilized in an industrial application for supplying power to a machine, a tool, or other manufacturing device. In one or more examples, the manufacturing system 200 includes an automated manipulator 204 and the machine tool 202. The manufacturing system 200 includes the first electrical connector assembly 102 that is coupled to the machine tool 202 and that may also be referred to as a tool-side connector assembly. The manufacturing system 200 includes the second electrical connector assembly 104 that is coupled to the automated manipulator 204 and that may also be referred to as a machine-side connector assembly. The first terminal assembly 108 and the second terminal assembly 112 are configured to contact each other to establish an electrical connection upon coupling the machining tool 202 to the automated manipulator 204.

In one or more examples, the automated manipulator 204 is an industrial robot or other robotic manipulator. The present disclosure recognizes that industrial robots perform a variety of tasks involving the movement and/or manipulation of physical objects. For example, a typical industrial robot includes a robotic arm equipped with a tool that allows the robot to automatically perform any one of various tasks, such as picking up, moving, drilling, cutting, welding, joining, applying fasteners, and the like. As a result, many different types of end effectors have been developed for deployment and use on robotic manipulators. The end effector includes the tool that is designed to perform one or more operations. The end effector also includes a linkage or coupling system that enables different end effectors to be interchangeably mounted to the end of the robotic manipulator. Such mechanical connection of different end effectors and, thus, different tools to the robot is often performed automatically. However, accommodating automatic electrical connections when interchanging different end effectors and, thus, different tools is more difficult. Accordingly, the electrical connection system 100 disclosed herein facilitates simple and reliable automatic electrical connection between the machine tool 202 and the power supply 206 during or upon mechanical connection of the machine tool 202 to the automated manipulator 204.

In one or more examples, the machine tool 202 is any one of various tools used for processing or machining a workpiece and that requires electrical power. An example of the machine tool 202 includes a cutter, such as an ultrasonic or transducer cutter.

In one or more examples, the manufacturing system 200 includes a mechanical coupling system 208. The coupling system 208 is configured to couple the machine tool 202 and the automated manipulator 204 together. In one or more examples, the mechanical coupling system 208 includes a first, or a tool-side, coupling assembly that is coupled to the machine tool 202. The mechanical coupling system 208 also includes a second, or a machine-side, coupling assembly that is coupled to the automated manipulator (e.g., robotic arm). The mechanical coupling system 208 is configured to automatically connect the first coupling assembly and the second coupling assembly when placed into alignment and contact, such as via an electromechanical or pneumatic actuator.

In one or more examples, the first terminal assembly 108 and the second terminal assembly 112 are configured to contact each other to establish the electrical connection upon coupling the machining tool 202 to the automated manipulator 204 using the mechanical coupling system 208. In one or more examples, the first terminal assembly 108 and the second terminal assembly 112 are at least approximately aligned with each other during alignment and connection of the mechanical coupling system 208. During and/or following connection of the mechanical coupling system 208, the first terminal assembly 108 and the second terminal assembly 112 are in abutting contact and the electrical connection is established. The biasing member 114 holds the first terminal assembly 108 and the second terminal assembly 112 in abutting contact and maintains the electrical connection.

As illustrated in FIGS. 2 and 3, in one or more examples, in the extended position (FIG. 2), a portion of the second terminal assembly 112 extends from the second housing 110. The first terminal assembly 108 and the second terminal assembly 112 are aligned upon coupling the machine tool 202 and the automated manipulator 204 together. The first terminal assembly 108 is configured to move the second terminal assembly 112 toward the retracted position (FIG. 3) upon contact of the first terminal assembly 108 and the second terminal assembly 112. The biasing member 114 urges the first terminal assembly 108 and the second terminal assembly 112 in abutting contact.

Figure 10:
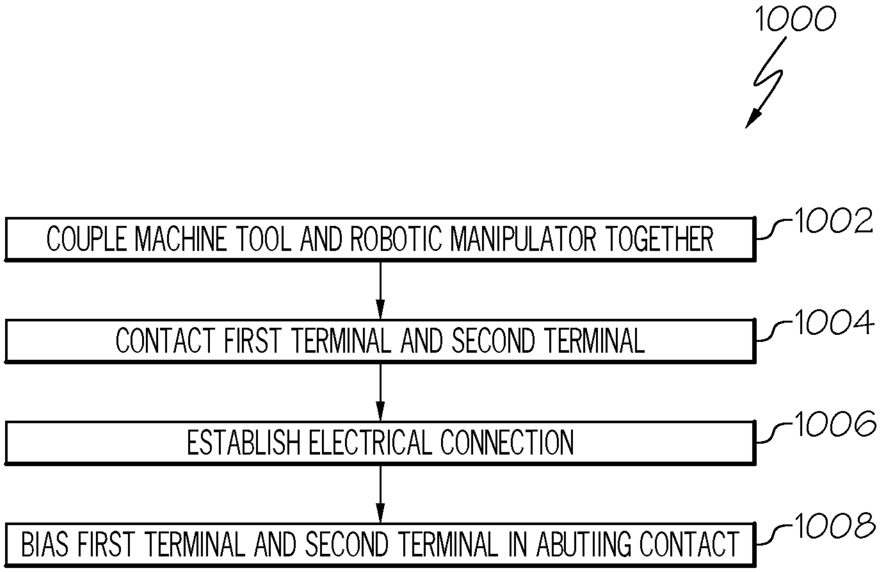
FIG. 10 is a flow diagram of an example of an electrical connection method.

Referring now to FIG. 10 and to FIGS. 1-9, by way of examples, the present disclosure is further directed to an electrical connection method 1000. Examples of the method 1000 are implemented using the electrical connection system 100 (FIGS. 1-9).

Referring to FIG. 10, in one or more examples, the method 1000 includes a step of (block 1002) coupling the machine tool 202 and the automated manipulator 204 together. In one or more examples, the machine tool 202 and the automated manipulator 204 are automatically coupled together using the mechanical coupling system 208.

In one or more examples, the method 1000 includes a step of coupling the first electrical connector assembly 102 to the machine tool 202. In one or more examples, the first housing 106 is mechanically coupled (e.g., via fasteners) to the machine tool 202. The first terminal assembly 108 is electrically coupled to the machine tool 202, for example, via the third terminal assembly 170. The step of coupling the first electrical connector assembly 102 to the machine tool 202 is performed before the step of (block 1002) coupling the machine tool 202 and the automated manipulator 204 together.

In one or more examples, the method 1000 includes a step of coupling the second electrical connector assembly 104 to the automated manipulator 204. In one or more examples, the second housing 110 is mechanically coupled (e.g., via fasteners) to the automated manipulator 204. The second terminal assembly 112 is electrically coupled to the power supply 206, for example, via the fourth terminal assembly 172. The step of coupling the second electrical connector assembly 104 to the automated manipulator 204 is performed before the step of (block 1002) coupling the machine tool 202 and the automated manipulator 204 together.

In one or more examples, the method 1000 includes a step of (block 1004) contacting the first terminal assembly 108 of the first electrical connector assembly 102, which is coupled to the machine tool 202, and the second terminal assembly 112 of the second electrical connector assembly 104, which is coupled to the automated manipulator 204, upon (e.g., during or upon completion of) the step of (block 1002) coupling the machine tool 202 and the automated manipulator 204 together.

In one or more examples, the method 1000 includes a step of (block 1006) establishing an electrical connection between the first terminal assembly 108 and the second terminal assembly 112 upon (e.g., during or upon completion of) the step of (block 1004) contacting the first terminal assembly 108 and the second terminal assembly 112.

In one or more examples, the method 1000 includes a step of (block 1008) biasing the first terminal assembly 108 and the second terminal assembly 112 in abutting contact. Biasing the first terminal assembly 108 and the second terminal assembly 112 in abutting contact holds the electrical connection.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-9, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-9, referred to above, need be included in every example and not all elements, features, and/or components described herein are necessarily depicted in each illustrative example. Accordingly, some of the elements, features, and/or components described and illustrated in FIGS. 1-9 may be combined in various ways without the need to include other features described and illustrated in FIGS. 1-9, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-9, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-9, and such elements, features, and/or components may not be discussed in detail herein with reference to each of FIGS. 1-9. Similarly, all elements, features, and/or components may not be labeled in each of FIGS. 1-9, but reference numerals associated therewith may be utilized herein for consistency.

In FIG. 10, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIG. 10 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the electrical connection system 100, the manufacturing system 200, and the method 1000 have been shown and described, modifications may occur to those skilled in the art upon reading the specification. The present application includes such modifications and is limited only by the scope of the claims.

What is claimed is:

1. An electrical connection system comprising:
a first electrical connector assembly, comprising:
a first housing; and
a first terminal assembly comprising:
a first ground terminal supported by the first housing;
a first power terminal supported by the first ground terminal; and
a first insulator situated between the first ground terminal and the first power terminal; and
a second electrical connector assembly, comprising:
a second housing;
a second terminal assembly comprising:
a second ground terminal supported by the second housing and movable relative to the second housing along a second terminal axis between an extended ground position and a retracted ground position;
a second power terminal supported by the second ground terminal and movable relative to the second ground terminal along the second terminal axis between an extended power position and a retracted power position;
a second insulator situated between the second ground terminal and the second power terminal; and
a biasing member that biases the second ground terminal toward the extended ground position and that biases the second power terminal toward the extended power position,
wherein the first terminal assembly and the second terminal assembly are configured to contact each other to establish an electrical connection upon arranging the first electrical connector assembly and the second electrical connector assembly near one another.

2. The electrical connection system of claim 1, wherein:
in the extended power position, a portion of the second power terminal extends beyond the second ground terminal;
the first power terminal is configured to move the second power terminal toward the retracted power position upon contact of the first terminal assembly and the second terminal assembly; and
the biasing member urges the first power terminal and the second power terminal in abutting contact.

3. The electrical connection system of claim 1, wherein:
the first insulator is situated around the first power terminal;
the first ground terminal situated around the first insulator;
the first housing is situated around the first ground terminal;
the second insulator is situated around the second power terminal;
the second ground terminal is situated around the second insulator;
the second housing is situated around the second ground terminal; and
upon contact of the first terminal and the second terminal assembly, the first power terminal and the second power terminal are in abutting contact and the first ground terminal and the second ground terminal are in abutting contact.

4. The electrical connection system of claim 1, wherein:
the first power terminal comprises a first power-terminal face;
the first ground terminal comprises a first ground-terminal face situated along a periphery of the first power-terminal face;
the second power terminal comprises a second power-terminal face;
the second ground terminal comprises a second ground-terminal face situated along a periphery of the second power-terminal face; and
upon contact of the first terminal assembly and the second terminal assembly, the first power-terminal face and the second power-terminal face are in abutting contact and the first ground-terminal face and the second ground-terminal face are in abutting contact.

5. The electrical connection system of claim 4, wherein:
the first insulator comprises a first insulator face comprising:
a first insulator-face planar portion; and
a first insulator-face nonplanar portion depending inward from the first insulator-face planar portion;
the second insulator comprises a second insulator face comprising:
a second insulator-face planar portion; and
a second insulator-face nonplanar portion projecting outward from the second insulator-face planar portion; and
the first insulator-face nonplanar portion and the second insulator-face nonplanar portion are proximate and not in contact with one another upon contact of the first terminal assembly and the second terminal assembly.

6. The electrical connection system of claim 4, wherein:
the first power-terminal face comprises:
a first power-terminal-face planar portion; and
a first power-terminal-face nonplanar portion projecting outward from the first power-terminal-face planar portion;
the second power-terminal face comprises:
a second power-terminal-face planar portion; and
a second power-terminal-face nonplanar portion depending inward from the second power-terminal-face planar portion; and
the first power-terminal-face nonplanar portion and the second power-terminal-face nonplanar portion mate with one another upon contact of the first terminal assembly and the second terminal assembly.

7. The electrical connection system of claim 1, wherein the second electrical connector assembly further comprises a first gasket situated between the second housing and the second ground terminal.

8. The electrical connection system of claim 1, wherein:

the second power terminal is coupled to the second insulator such that the second power terminal and the second insulator move together relative the second ground terminal; and the biasing member comprises:

a first spring engaged with the second housing and the second ground terminal; and a second spring engaged with the second ground terminal and the second insulator.

9. The electrical connection system of claim 1, wherein the second electrical connector assembly further comprises a second gasket situated between the second ground terminal and the second insulator.

10. The electrical connection system of claim 1, wherein:

the second power terminal and the second insulator move with the second ground terminal relative to the second housing;

the second power terminal is coupled to the second insulator such that the second power terminal and the second insulator move together relative the second ground terminal; and the biasing member comprises:

a first spring situated between and engaged with the second housing and the second ground terminal; and a second spring situated between and engaged with the second ground terminal and the second insulator.

11. The electrical connection system of claim 10, wherein the second electrical connector assembly further comprises:

a first gasket situated between the second housing and the second ground terminal; and a second gasket situated between the second ground terminal and the second insulator.

12. The electrical connection system of claim 1, wherein:

the first electrical connector assembly further comprises a seal situated around the first ground terminal; and the seal is configured to engage the second housing upon contact of the first terminal assembly and the second terminal assembly.

13. The electrical connection system of claim 1, wherein:

the first electrical connector assembly further comprises a third terminal assembly supported by the first housing and electrically connected to the first terminal assembly;

the second electrical connector assembly further comprises a fourth terminal assembly supported by the second housing and electrically connected to the second terminal assembly;

the third terminal assembly is configured to be electrically connected to a machine tool; and the fourth terminal assembly is configured to be electrically connected to a power supply.

14. An electrical connection method using the electrical connection system of claim 1, the method comprising steps of:

coupling the first electrical connector assembly to a machine tool;

coupling the second electrical connector assembly to a robotic manipulator;

coupling the machine tool and the robotic manipulator together;

contacting the first terminal assembly of the first electrical connector assembly and the second terminal assembly of the second electrical connector assembly upon coupling the machine tool and the robotic manipulator together;

establishing an electrical connection between the first terminal assembly and the second terminal assembly upon contacting the first terminal assembly and the second terminal assembly; and biasing the first terminal assembly and the second terminal assembly in abutting contact.

15. The electrical connection system of claim 4, wherein:

the first power-terminal-face nonplanar portion is semi-spherical; and the second power-terminal-face nonplanar portion is conical.

16. A manufacturing system comprising:

a robotic manipulator;

a machine tool;

a first electrical connector assembly coupled to the machine tool and comprising:

a first housing; and a first terminal assembly comprising:

a first ground terminal supported by the first housing;

a first power terminal supported by the first ground terminal; and a first insulator situated between the first ground terminal and the first power terminal; and a second electrical connector assembly coupled to the robotic manipulator and comprising:

a second housing;

a second terminal assembly comprising:

a second ground terminal supported by the second housing and movable relative to the second housing along a second terminal axis between an extended ground position and a retracted ground position;

a second power terminal supported by the second ground terminal and movable relative to the second ground terminal along the second terminal axis between an extended power position and a retracted power position;

a second insulator situated between the second ground terminal and the second power terminal; and a biasing member that biases on the second ground terminal toward the extended ground position and that biases the second power terminal toward the extended power position, wherein the first terminal assembly and the second terminal assembly are configured to contact each other to establish an electrical connection upon coupling the machining tool to the robotic manipulator.

17. The manufacturing system of claim 16, further comprising a coupling system configured to couple the machine tool and the robotic manipulator together.

18. The manufacturing system of claim 15, wherein:

in the extended power position, a portion of the second power terminal extends beyond the second ground terminal;

the first terminal assembly and the second terminal assembly are aligned upon coupling the machine tool and the robotic manipulator together;

the first power terminal is configured to move the second power terminal toward the retracted power position upon contact of the first terminal and the second terminal assembly; and the biasing member urges the first power terminal and the second power terminal in abutting contact.

19. The manufacturing system of claim 16, wherein:

the first power terminal extends along a first terminal axis;

the first insulator is situated around the first power terminal about the first terminal axis;

the first ground terminal is situated around the first insulator about the first terminal axis;

the first housing is situated around the first ground terminal about the first terminal axis;

the second power terminal extends along the second terminal axis;

the second insulator is situated around the second power terminal about the second terminal axis;

the second ground terminal is situated around the second insulator about the second terminal axis;

the second housing is situated around the second ground terminal about the second terminal axis;

the second power terminal is coupled to the second insulator such that the second power terminal and the second insulator move together relative the second ground terminal;

the second power terminal and the second insulator move with the second ground terminal relative to the second housing;

the biasing member comprises:

a first spring engaged with the second housing and the second ground terminal to bias the second ground terminal, the second power terminal, and the second insulator in the extended ground position; and a second spring engaged with the second ground terminal and the second insulator to bias the second power terminal and the second insulator in the extended power position;

upon contact of the first terminal assembly and the second terminal assembly, the first power terminal and the second power terminal are in abutting contact and the first ground terminal and the second ground terminal are in abutting contact.

20. The manufacturing system of claim 16, wherein:

the first electrical connector assembly further comprises a third terminal assembly supported by the first housing and electrically connected to the first terminal assembly;

the second electrical connector assembly further comprises a fourth terminal assembly supported by the second housing and electrically connected to the second terminal assembly;

the third terminal assembly is electrically connected to the machine tool; and the fourth terminal assembly is configured to be electrically connected to a power supply.

* * * * *